Patented Oct. 30, 1928.

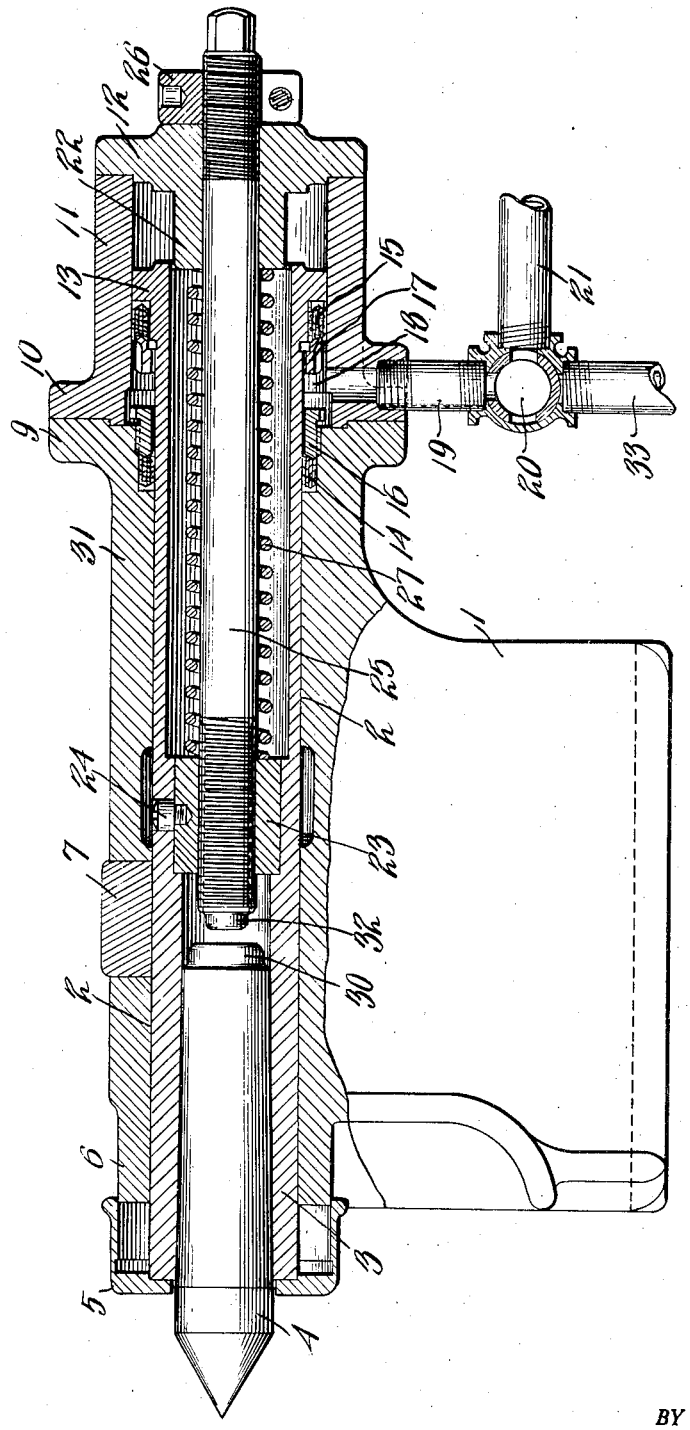

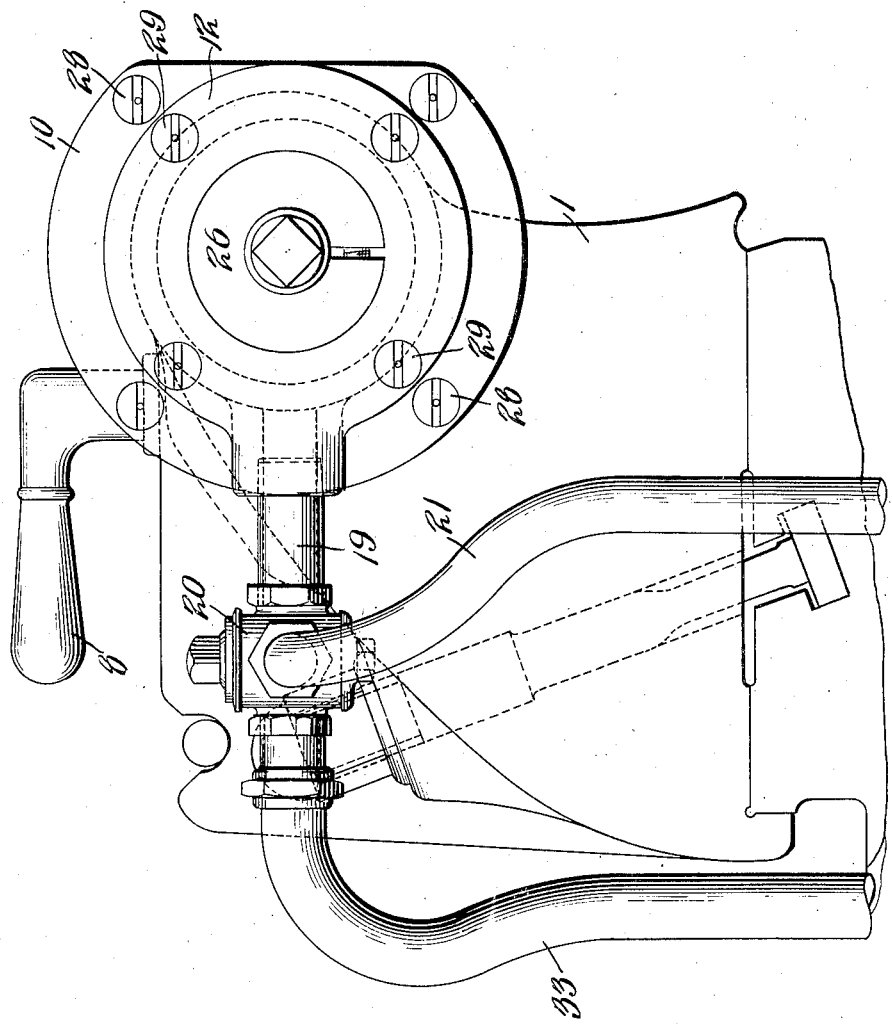

1,689,410

UNITED STATES PATENT OFFICE.

AMOS P. STEINER, OF WAYNESBORO, PENNSYLVANIA, ASSIGNOR TO LANDIS TOOL COMPANY, OF WAYNESBORO, PENNSYLVANIA.

HYDRAULIC FOOTSTOCK.

Application filed March 5, 1927. Serial No. 173,185.

My invention relates to hydraulically operated foot stock for grinding machines and other mechanism of the same general type.

It is an object of the same to provide a foot stock which may be withdrawn from the work by fluid pressure.

It is a further object to provide a foot stock in which a work center is held in working position by resilient means and is withdrawn therefrom by fluid pressure.

It is a further object to provide a foot stock which may be quickly operated and which may be operated also with a minimum expenditure of energy and which is simple in construction, easily assembled and easily repaired.

Referring to the accompanying drawings which are made a part hereof and on which similar reference characters indicate similar parts, Figure 1 is a sectional plan view of the device, Figure 2 is an end elevation.

In the drawings reference character 1 indicates a base having a cylindrical bore 2 in its upper portion in which is reciprocally mounted a sleeve 3 carrying a work center 4. The sleeve 3 carries on its outer end a cup-shaped member 5 surrounding the work center 4 and telescoping with a cylindrical portion 6 of the base 1 to prevent dirt from lodging between the sleeve 3 and the inside of the cylinder 2. A clamp 7 operated by a lever 8 serves to hold the sleeve 3 in any desired position. A cylinder 11 having a flanged portion 10 is secured by means of screws or bolts 28 to a flanged portion 9 of a cylindrical portion 31 on the upper part of the base 1. The cylinder 11 is closed by a cover plate 12 attached to the cylinder by means of bolts or screws 29. The sleeve 3 has a flanged portion 13 fitting within the cylinder 11. Suitable packing material 14 and 15 held in place by rings 16 and 17 provide a fluid tight chamber 18 for receiving pressure fluid through pipe 19, valve 20, and pipe 21, the latter being in communication with a source of fluid under pressure. The cover plate 12 has an abutment 22 on its inner face. A nut 23 is secured within the sleeve 3 by means of a screw 24. An adjusting pin 25 is screw-threaded in the nut 23 and extends therethrough. The outer end of the pin 25 is threaded to receive a nut 26. Surrounding the pin 25 and acting between the nut 23 and abutment 22 is a compression spring 27.

The operation of the device is as follows:

When it is desired to withdraw the work center from the work the three-way valve 20 is rotated so as to admit pressure fluid from pipe 21 through pipe 19 into the chamber 18 and against the piston head 13 to force the sleeve to the right as shown in Fig. 1 and thus withdraw the work center 14 from engagement with the work. When it is desired to have the work center in engagement with the work, valve 21 is rotated in a counter-clockwise direction as shown in Fig. 1 so as to connect pipe 19 with the exhaust passage 33. The compression spring 27 acting against nut 23 urges the sleeve to the left and the work center 4 in engagement with the work and also forces pressure fluid from the chamber 18 through pipe 19, valve 20 to the exhaust. Nut 26 serves to limit the movement of the sleeve 3 when the work center is not in engagement with the work. By means of clamping device 7 the sleeve 3 may be clamped in any desired position. In order to force the work center 4 from the interior of the sleeve 3 the shaft 25 may be rotated until the end 32 engages the inner end 30 of the work center thereby forcing the center from within the sleeve. Pipes 21 and 33 are preferably flexible as will be readily understood.

It will be obvious to those skilled in the art that various changes may be made in my device without departing from the spirit of my invention, and I, therefore, do not limit myself to what is shown in the drawings, and described in the specification, but only as set forth in the appended claims.

Having thus fully described my said invention, what I claim as new and desire to secure by Letters Patent, is:

1. A foot stock comprising a base having a longitudinal bore therein, a sleeve mounted within the bore adapted to carry a work center at one end and having a flange on the other end, a cylindrical chamber in which said flanged piston is adapted to reciprocate, means for admitting fluid pressure against said flanged portion to actuate the sleeve in one direction and resilient means for returning it in the other direction and adjustable means limiting its movement in said lastnamed direction, substantially as set forth.

2. A foot stock comprising a work center, a sleeve in which said center is held, a nut within said sleeve, a rod within said sleeve and extending through said nut, a compression spring surrounding the rod and urging the work center in the direction of the work, a nut on the outer end of the rod to limit the movement of the sleeve in said direction, and fluid pressure means for withdrawing the work center from the work, substantially as set forth.

In witness whereof, I have hereunto set my hand at Waynesboro, Pennsylvania, this 3rd day of March, A. D. nineteen hundred and twenty-seven.

AMOS P. STEINER.